United States Patent [19]

Wood et al.

[11] Patent Number: 4,478,629
[45] Date of Patent: Oct. 23, 1984

[54] POWER FAILURE DETECTION SYSTEM FOR A GLASSWARE FORMING MACHINE

[75] Inventors: Charles L. Wood; Glenn H. Mapes, both of Muncie, Ind.; Stephen W. Daudt, Longmont, Colo.

[73] Assignee: Ball Corporation, Muncie, Ind.

[21] Appl. No.: 281,500

[22] Filed: Jul. 8, 1981

[51] Int. Cl.³ .............................................. C03B 5/38
[52] U.S. Cl. ........................................ 65/163; 65/29; 65/160; 65/158; 65/164; 65/DIG. 13; 364/473; 364/483
[58] Field of Search ............... 364/551, 480, 483, 473; 65/160, 164, 158, 159, DIG. 13, 29

[56] References Cited

U.S. PATENT DOCUMENTS

| | | | |
|---|---|---|---|
| 3,574,587 | 4/1971 | Grundy et al. | 65/164 X |
| 3,644,111 | 2/1972 | Becker | 65/158 |
| 4,007,028 | 2/1977 | Bublitz | 65/164 X |
| 4,108,623 | 8/1978 | Cardenas-Franco | 65/164 X |
| 4,266,961 | 5/1981 | Wood | 364/473 X |
| 4,338,115 | 7/1982 | Farkas | 65/158 X |
| 4,364,764 | 12/1982 | Farkas et al. | 65/159 X |

OTHER PUBLICATIONS

Electronic and Computer Control of the Heye 1-2 Glass Container Forming Machine; H. G. Seidel, "Glass Technology", vol. 22, No. 3, Jun. 1981, pp. 131-134.

Primary Examiner—Arthur Kellogg
Attorney, Agent, or Firm—Gilbert E. Alberding

[57] ABSTRACT

The invention involves a system for detecting power failures in a glass ware forming machine and for effecting either a programmed stop of the machine which permits removal of all molten glass in the machine prior to a shutdown or a more rapid emergency stop. Also a machine speed monitoring system shuts down the machine when the speed slows below a predetermined limit. A supplemental battery system is provided to maintain power during emergencies to permit a sequenced shut down. The programmed control is organized to shut down the elements of the machine to initialized positions.

55 Claims, 5 Drawing Figures

POWER FAILURE DETECTION SYSTEM FOR A GLASSWARE FORMING MACHINE

BACKGROUND OF THE INVENTION

The present invention relates to electronically controlled glassware forming machines and, in particular, to a power failure detection system for use in such an electronic controller.

In general, the individual section glassware forming machine (IS machine) is well known in the art. The IS glassware forming machine comprises a plurality of, typically either, ten, or twelve, "individual sections". Each individual section includes all of the necessary elements for forming rigid glassware from a gob of molten glass. The individual sections of the glass forming machine typically cooperate with a "gob distributor" mechanism, which sequentially provides gobs of glass to the respective individual sections on a periodic basis. The individual sections of the machine also cooperate with a common conveyor system which is utilized to transport the rigid glassware to an annealing lehr. A "stacker" for arranging the glassware on the conveyor and ware inspection apparatus are typically disposed to operate on the glassware as it travels on the conveyor.

The respective individual elements of a section are operated in a cyclical timed relation, in synchronism with the gob distributor, to form the rigid glassware from the gob. The individual elements are typically driven by pneumatic pressure, selectively applied to the elements through a valve block associated with the section. Historically, the valve block cooperated with a mechanical controller in the form of a rotary drum, bearing respective cams corresponding to each functional element operation. The cams on the drum open or close cooperating mechanical valves (e.g. tappet valves) in timed sequence as the drum rotates. The relative dispositions of the cam about the perimeter of the drum control the timed sequence of operation of the individual section elements. A glassware forming machine utilizing a mechanical drum controller is described in U.S. Pat. No. 1,911,119 issued to Ingle in June, 1933.

More recently, electronic controllers and valve blocks have been utilized to effect the timed operation of the elements to form the rigid glassware. The first such electronic controller is described in U.S. Pat. No. 3,762,907 issued Oct. 2, 1973 to Quinn and Kwiatkowski, assigned to the common assignee herewith. The basic electronic controller now typically used in the industry is described in U.S. Pat. No. 3,969,703 issed to Kwiatkowski and Wood on July 13, 1976 and reissued as U.S. Pat. RE No. 29,642 on May 23, 2978. In general, the electronic controller includes a memory having locations corresponding to each section element operation. The memory location is loaded with, among other things, the point in the machine cycle when the operation is to be effected. (The machine cycle is typically thought of as being divided into 360 degrees, holding over the terminology that developed from the mechanical drum controller.) The stored cycle values are sequentially compared with indicia of the actual machine cycle position. Upon a favorable comparison, a signal is generated to an appropriate driver, which in turn operates on a solenoid valve.

As described in more detail in the above mentioned patent to Quinn and Kwiatkowski, U.S. Pat. No. 3,762,907, the IS section typically includes a delivery mechanism such as a scoop, trough and deflector for receiving the molten gob of glass from the gob distributor and depositing the gob through a funnel into a blank mold. A "settle blow" step is then effected whereby a baffle is positioned over the funnel and air is discharged into the blank mold through the baffle to force molten glass into a neck ring mechanism (for forming the mount of the glassware and any threads thereon). The neck ring mechanism includes a plunger which forms a small pocket in the gob. A counter blow step is then effected whereby the funnel is removed, the baffle moved against the top of the blank mold, the plunger retracted, and air introduced into the depression left in the glass by the plunger. The counter blow air causes the glass to fill the blank, forming what is known as a parison. The parison is then transferred to a blow mold on the other side of the machine. The counter blow step generates a cold skin on the parison to provide sufficient rigidity for the transfer. The blank mold opens, and a typical transfer mechanism, generally known as the invert arm, removes the parison from between the open halves of the blank mold and places it between the closing halves of a blow mold, supported in an upright position by the neck ring. The parison is then reheated (typically by the confined heat of the interior of the parison itself) and again becomes malleable. A final blow step is then effected whereby a blow head is positioned over the blow mold and blow air is forced into the soft parison, causing it to assume the shape of the blow mold. Heat is absorbed by the mold walls, cooling the glass to a point where it is sufficiently rigid to permit handling. The halves of the blow mold are then opened and a take-out mechanism grasps the ware at the neck thereof and transports it to a dead plate. After a predetermined cooling period, a push out arm moves the ware onto the conveyor.

Two problems that have plagued the glassware industry have been establishing initial synchronization between the gob distributor and the individual section and ensuring that molten glass does not harden on the machine elements if the machine operation is halted for some reason. More specifically, the machine elements of the section must be arranged in a predetermined initial state in order for the proper synchronized sequence of operations to be effected. However, when the machine is stopped on an emergency basis, the elements are typically not in the predetermined initial positions. In addition, even when the machine is stopped with the respective elements in a predetermined position, the elements are often manually moved by an operator during maintenance or the like. Moreover, molten glass is often still on or within the elements when the stop is effected. If glass is retained and hardens in an element, (particularly the molds), it typically must be chipped out, often with damage to the element. Such a chipping operation is exceedingly costly in terms of machine down time. Thus, it is necessary that provisions be made to facilitate the clearing of molten glass from the respective machine elements when machine operation is halted. This is particularly true where an electronic controller is used, rendering the machine more susceptible to power outages.

The problems associated with stopping and starting an IS machine are addressed in the above mentioned U.S. Pat. No. 3,762,907 to Quinn et al. As described in Quinn et al, a predetermined sequence of steps is performed without interruption before normal operation of the machine (i.e., actual formation of glassware) is begun. Similarly, a "programmed stop" is described whereby respective groups of elements are inhibited. For example, first, the "scoop on" function is inhibited, preventing further delivery of molten glass to the section. When the machine operation reaches the point in the machine cycle when the scoop on operation would normally be effected, various other functions such as "blank closed", "thimble on", "funnel on", "plunger on", "baffle on", "crack blank on", and "settle blow on" are inhibited. When the machine thereafter reaches the point where the "invert on" step would normally be effected, various other functions are inhibited: "neck ring off", "blow head on", "revert on", "final blow on", "mold close on", "take out arm on", and "puff air on". Similarly, when the machine cycle again reaches the point where the "scoop on" operation would normally be effected, another group of functions is inhibited: "invert on", "bottom plate up on", and "button plate down on", "blank open on", "mold open on", and "counter blow on".

Thereafter, when the machine cycle reaches the point where the "invert on" operation would normally be effected, power is removed from all of the solenoid valves. Such a sequence of operation ensures that no molten glass is left in the section when it is stopped.

It was also recognized, in the Quinn and Kwiatkowski patent, that emergency circumstances can arise which do not provide time for running through a programmed sequence of steps before halting machine operation. Accordingly, an "emergency stop" was provided whereby power was removed from all of the solenoid valves so that the valves would assume respective normally opened or normally closed positions. A normally opened or normally closed valve was association with a particular element to facilitate removal of molten glass from the machine elements. For example, when power was removed from the associated solenoid, the respective molds would open, thus allowing the operator access to remove molten glass from the molds.

Programmed start, programmed stop, and emergency stop provisions are also described in the U.S. Pat. No. 3,969,703 Kwiatkowski and Wood patent.

In addition, systems have been proposed wherein the operating program, control program, and timing data are stored in a supervisory computer associated with a plurality of individual section computers. The control program and job histories for forming a particular glassware are stored in the supervisory computer and are selectively loaded into the individual section computers. The individual section computers then control the glassware formation. At predetermined intervals, the supervisory computer reads the current timing data from each of the individual section computers and stores the data in a non-volatile memory. Upon restoration of power after a power failure, the data is reloaded into the individual section computers. Loss of data and consequent down time are thus prevented. Such a system is described in U.S. Pat. No. 4,152,134 issued May 1, 1974 to Dowling et al. However, this type of a system does not address the problem of the retention of molten glass in the respective machine elements.

SUMMARY OF THE PRESENT INVENTION

The present invention provides a method and apparatus for detecting power failures and effecting either a programmed stop or emergency stop of the apparatus, whichever is more appropriate. Similarly, failure of the synchronizing mechanisms is detected and, for example, an emergency stop effected. Provisions are also made for initializing the positions of the elements for restarting of the apparatus.

BRIEF DESCRIPTION OF THE DRAWINGS

A preferred exemplary embodiment of the present invention will hereinafter be described in conjunction with the accompanying drawings wherein like numerals designate like elements and.

DETAILED DESCRIPTION OF PREFERRED EXEMPLARY EMBODIMENT

Figure 1:
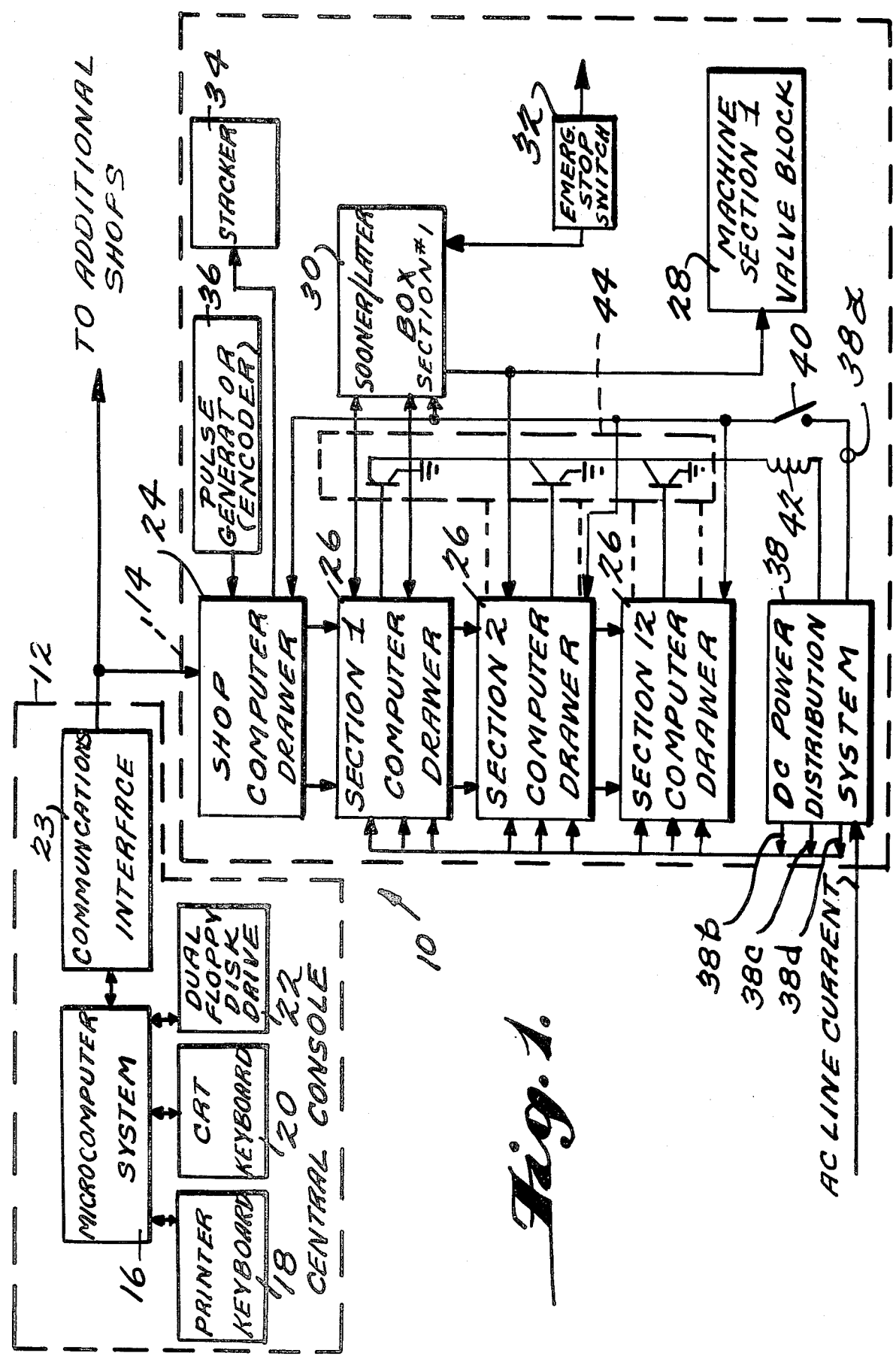
FIG. 1 is a block diagram of an electronic control system for glassware forming machinery.

Referring now to FIG. 1, a glassware forming system 10, in accordance with the present invention, will be described. Glassware forming system 10 provides distributed control of the respective IS sections. To this end, glassware forming system 10 preferably includes a central console 12 cooperating with a plurality of shops 14.

Central console 12 provides interfacing between an operator (or with still an additional level of computer command) and the respective shops 14. Central console 12 also provides storage and management of job history information (e.g., maintains a library of job histories) and status information for the respective shops.

Central console 12 suitably includes a microcomputer 16 associated with suitable data input/output mechanisms (e.g., a printer/keyboard 18 and a CRT display/-keyboard 20); a nonvolatile mass storage device 22 (e.g., a dual floppy disk drive); and a suitable communications interface 23 (e.g., as a standard RS 232 interface). Microcomputer 16 suitably comprises an Intel "single board computer" (SBC) system 80 microcomputer including a central processing unit (CPU) (Intel SBC-86/12 CPU) and integral random access and read only memories (Intel SBC-064-64K RAM and SBC-464-32K ROM). Respective controllers for input/output (Intel SBC-544-I/O) and the disk unit (SBC-202) are also included. (None shown.)

Each stop 14 includes the equipment associated with a given glassware forming machine, for example, as previously noted, a plurality of IS machine sections, a glass dispensing mechanism (e.g., gob distributor), conveyor system, stacker, wear inspection apparatus, and annealing lehr. (Only the stacker and an exemplary IS valve block are shown in FIG. 1.)

Each shop 14 also includes a shop computer 24 and respective section computers 26. Each section computer 26 is associated with a respective one of the individual sections and is coupled to the valve block 28 of the associated IS machine section. An operator control, termed "sooner/later" box 30 is provided, including operator controls for initiating programmed start, programmed stop and emergency stop of the section. The sooner/later box also includes provisions for operator alteration of the points in the machine cycle (degrees) at which the respective functions are effected and, in addition, provides section status information to section computer 26. The section status information includes, for example, such information as the running status of the section (i.e., that the section is running), indicia of program start, program stop or emergency stop operator commands, and changes in function cycle positions. Each section also has associated therewith at least one emergency stop switch 32. For a description of a suitable electronic valve block, reference is made to U.S. patent application Ser. Nos. 12,862 and 68,276 filed by Earl Lowe on Feb. 2, 1979, and Aug. 20, 1979, respectively, copending and commonly assigned herewith. Further description of the emergency stop switch 32 and sooner/later control box 30 is found in the previously mentioned U.S. Pat. No. 3,672,907 (Quinn and Kwiatkowski) and U.S. Pat. RE. No. 29,642 (Kwiatkowski and Wood).

Shop computer 24 provides for interfacing the elements of the respective shops to central console 12, provides an interface between the individual sections and the equipment common to all of the individual sections of the shop, and effects control of the various common equipment. Shop computer 24 will be hereinafter more fully described in conjunction with FIG. 2. The respective section computers 26 generate all timing signals to effect actual control of the associated section of the glassware forming machine. Section computers 26 will be hereinafter more fully described in conjunction with FIG. 3.

Power for shop computer 24, the respective section computers 26, and sooner/later box 30 is provided through a DC power distribution system 38. DC power distribution system 38 converts AC line current into the appropriate DC signals for the section computers 26 and shop computer 24, while at the same time monitoring the power to detect any power outages. As will hereinafter be more fully explained in conjunction with FIG. 4, power distribution system 38 provides the appropriate power signals to the shop computer 24 and respective section computers 26 through line 38a. A relay 40 with a control coil 42 coupled to the output of a hard wire OR gate 44 is utilized to selectively couple line 38a to the respective section computers 26, shop computer 24, and sooner/later box 30, as will be explained. Power distribution system 38 also charges a bank of battery cells, and monitors the condition of the batteries to generate status signals indicative of proper connection of the batteries, the charge level of the batteries, and any current draw from the battery. The status signals are transmitted to each section computer 26 on respective lines 38b, 38c, and 38d (shown as a single line in FIG. 1). The section computer 26 monitors the battery status signals and, when appropriate, effects either a programmed stop or emergency stop of the section.

Still referring to FIG. 1, the functions of central console 12 will now be more fully described. As noted above, central console 12 is the repository for all job history and production data. A library of job histories is stored in nonvolatile memory 22 of microcomputer 16. A job history includes all information necessary for an individual section to form a particular type of glassware. The job history includes, for example, data associating a particular function with a particular solenoid, identification of particular programmed start and stop sequences, initial parts positioning data, the timing data for the respective functions (the points in the machine cycle when the operation of the particular element/function is to be effected), and stacker control information. Control settings for the gob distributor and conveyor motors would also be included, where the job distribution and conveyor are under control of shop computer 24. The job history files can be created, deleted, or edited by the operator through the input/output devices 18 or 20. All production information is also stored in nonvolatile memory 22.

Console 12 maintains a table in memory having locations corresponding to each particular section (identified by shop and section numbers). The identity of a particular job history is designated for the section and is maintained in the corresponding location in the table. The job history numbers are initially entered through CRT/keyboard 20. Console microcomputer 16 upon command accesses the identified job history from nonvolatile memory 22 and checks to ensure that there is proper address correlation among the designated multiplexer outputs and solenoid drivers and the hardware of the particular section. The start program and stop program numbers in the job history are also checked for validity. Assuming that the job history numbers are valid, central console 12 then retrieves the identified programs from memory and transmits the data to the respective shops 14. The shop computer 24 of the designated shop records the data transmitted in memory and thereafter addresses the appropriate section computers 26 to communicate the function timing and stop/start data to section computers 26, as will be explained.

Central console 12 is also utilized for error correction of job settings. Ware inspection apparatus in each shop, preferably a hot end gauger such as described in U.S. patent application entitled "Glassware Gauging System" Ser. No. 281,467, filed by S. Daudt on or about even date and commonly assigned herewith, provide data indicative of the parameters of the actual ware produced. The data is compared to ideal parameter data previously stored in microcomputer 16. Graphic depictions of the actual ware and the ideal ware are concurrently provided on CRT 20, with the respective images superimposed. The operator can then find the average deviation of any point on the bottle by using conventional light pen techniques to identify the point. Correction of the timing data to correct the error is then effected manually or effected through preprogramming of microcomputer 16. For a more detailed description of the feedback error correction process, reference is made to U.S. patent application Ser. No. 468,457, entitled "Management Control System", filed by Mapes et al on or about even data and commonly assigned herewith.

Figure 2:
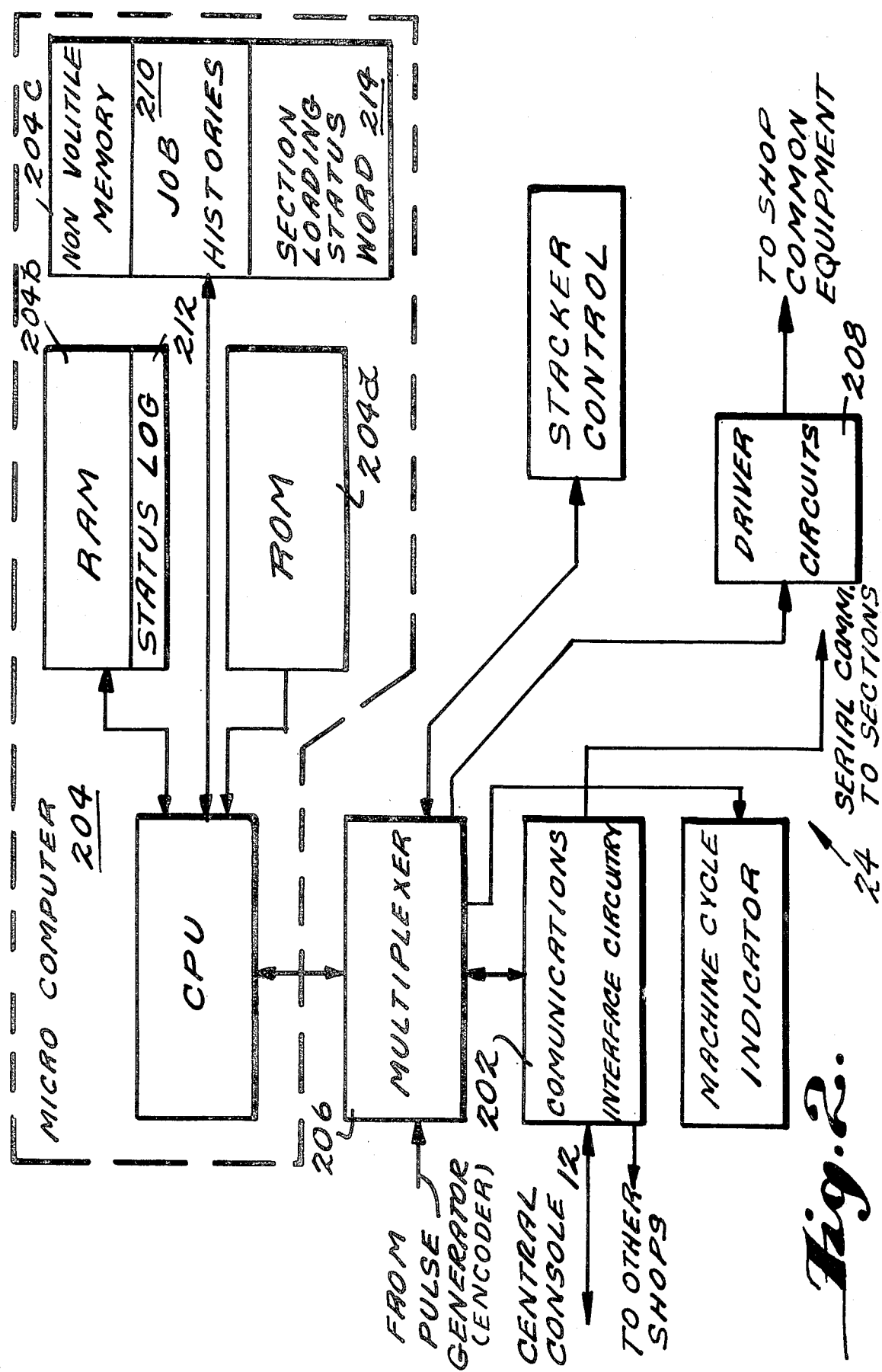
FIG. 2 is a block diagram of the shop computer of FIG. 1.

Referring now to FIG. 2, shop computer 24 will be more fully described. Shop computer 24 suitably comprises appropriate conventional communications interface circuitry 202 for selectively receiving communications from central console 12, a microcomputer 204, and appropriate signal routing circuitry 206. Microcomputer 204 is suitably an Intel SBC 80/05 with associated read only memory 204a and random access memory 204b and nonvolatile memory (e.g., bubble memory 204c). Signal routing circuitry 206 operates to accept only signals intended for the particular shop and to direct the information, when appropriate, to a designated one or more of the section computer 26 of the shop. Signal routing circuitry 206 suitably comprises a multiplexer formed by a matrix of addressable latches.

Communications between central console 12 and the respective shops are in the form of serial transmissions in accordance with standard techniques such as RS-232. Each transmission is in a format which identifies the beginning and end of the message and the address of the particular shop to which the message is directed. When a message is transmitted from central console 12, only the shop with the transmitted address will respond. The shop computer 24 of the particular shop 14 addressed then operates on the serial transmission. The shops not addressed ignore all serial transmission until an "END" signal is detected from central console 12. Typically, a message from central console 12 is directed to particular sections of the addressed shop. The addressed shop computer 24, upon command, transmits job history data to the appropriate section computers 26 in the shop. In addition, shop microcomputer 204 maintains the job history (function timing data) in a portion (generally indicated as 210) of nonvolatile memory 204c to facilitate restart of the shop as will be explained. The job history data in memory is updated each time a job setup message is received.

In addition to serving as an interface between central console 12 and the individual section computers 26, shop computer 24 provides for control and monitoring of stacker 34, the gob distributor (not shown) (e.g., counts and displays the shear cuts per minute), and monitoring of the respective sections. The control programs relating to such control and monitoring are maintained in ROM 204a. Driver circuitry 208 can be included, if desired, to effect such control.

In monitoring the respective sections, shop microcomputer 204 maintains a status log for each of the individual sections in the shop in random access memory 204b. The log includes the indicia (job number) of the particular type of glassware presently being formed by the section, and indicia of any error status, a count of running time (suitably) reset every 8 hours) and a count of section down time. The status log information is provided to central console 12 on request and is utilized to facilitate job management (as to, for example, materials) at central console 12. For a more detailed description of such job management operations, reference is made to the aforementioned U.S. patent application Ser. No. 468,457, "Management Control System" filed by Mapes et al.

In addition, shop microcomputer 204 maintains in a portion of nonvolatile memory 204c indicia of whether the respective section computers 26 have been properly loaded with the necessary job information (generally indicated as section loading status word 214). Upon power up of the shop, section loading status word 214 is scanned before transmission of a job history is effected by control console 12. When the shop is initially activated, i.e., upon intitial power up, the loading status flags are reset to zero, and shop computer 24 thereafter requests a "job setup" from central console 12. When the appropriate data is loaded into the respective section computer 26 memories, the job history flag is set to 1. Thus if the flag is found equal to 1 upon power up, it becomes apparent that the shop computer automatically loads the sections with the appropriate data maintained in the shop computer nonvolatile memory portion 210, thus avoiding the necessity of obtaining the data from central console 12.

Figure 3:
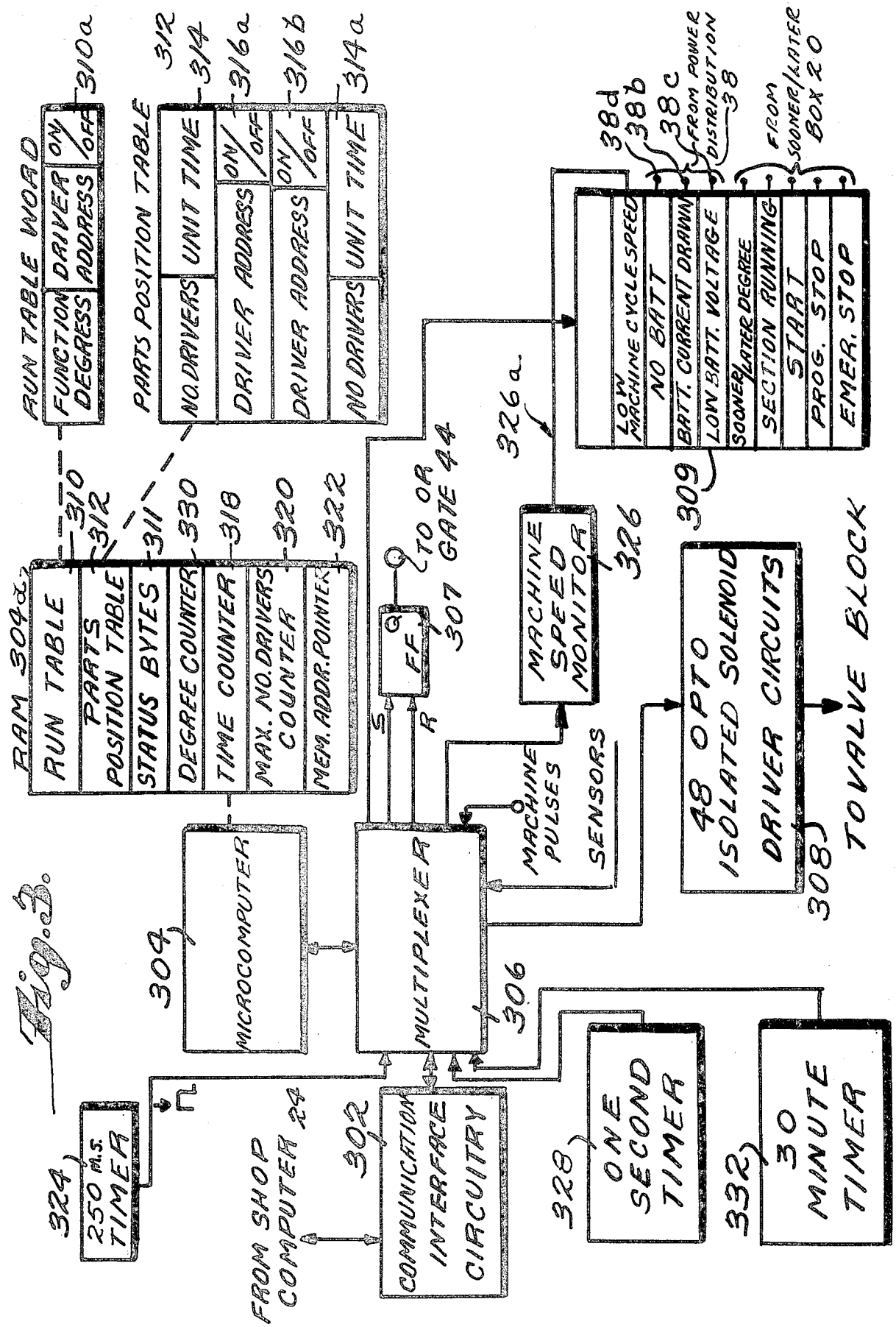
FIG. 3 is a block diagram of a section computer of FIG. 1.

As noted above, section computer 26 generates timing signals to the associated section to effect actual control of the machine section. Referring now to FIG. 3, section computer 26 will be described.

Section computer 26 suitably comprises conventional communications interfacing circuitry 302, a microcomputer 304 (e.g., Intel SBC 80/05) with associated random access memory 304a and non-volatile read only memory (ROM) (not shown), suitable signal routing circuitry (multiplexer) 306, and various input/output systems.

Multiplexer (MUX) 306 provides for selective communication to and from microcomputer 304. MUX 306, in effect, provides a data connection between an input port and one of a plurality of output ports, in accordance with an output port address supplied as a control signal to MUX 306 by microcomputer 304. MUX 306 is suitably formed of a matrix of addressable latches with respective accessible bits providing the MUX outputs. Computer 304 inputs an address and data byte to MUX 306, and the latch designated by the address is then loaded with the data byte. The contents of the latches are maintained until changed by computer 304 or loss of power. Communications interface 302 provides for communcation between section computer 26 and shop computer 24 and is suitably a standard RS-232 interface.

Section computer 26 suitably also includes a machine speed monitor 326 for generating indicia of the actual cycle speed of the machine relative to a threshold value. Machine speed monitor 326 will be more fully described in conjunction with FIG. 5.

A number of the MUX 306 output ports are optically coupled to a bank of solenoid driver circuits 308. Each driver circuit is associated with a respective solenoid valve on the individual section machine (typically disposed in valve block 28 (FIG. 1)). The particular individual driver circuits are thus selectively addressed by microcomputer 304 by generating output signals indicative of (i.e., outputting) the address associated with the corresponding MUX 306 output port.

Other MUX 306 output ports are respectively connected to the on input terminal of OR gate 44 and to the control input terminals of a buffer register 309. Buffer register 309 suitably comprises a parallel-in/serial-out shift register/latch cooperating with appropriate interfacing circuit (not shown) for microcomputer 304.

The respective battery status signals from power distribution system 38, and a low machine speed signal from machine speed monitor 326 (as will be described) are each applied to a respective input terminal of buffer register 309. The contents of buffer register 309 are periodically loaded into corresponding locations (status bytes 311) in RAM 304a in response to a command by computer 304 (outputting the MUX output address of the appropriate control terminal). The command is suitably periodically generated at a rate greater than the machine cycle speed.

As noted above, job history originates in console 12 and is loaded into the memory of section microcomputer 304 by shop computer 24. The information required to activate (or deactivate) a function is loaded into a portion of microcomputer 304 memory (hereinafter referred to as the "Run Table"), generally indicated in FIG. 3 as 310. Run table 310 suitably contains a respective 16 bit word corresponding to each function in the machine cycle. The turning on and turning off of a given section part (element) is treated as a separate function in the Run Table. Each word contains indicia of the point in the cycle when the function is to be effected (function degrees), indicia of the multiplexer output address corresponding to the driver circuit associated with the function (driver address), and indicia of whether the function is an on or off function (on/off). A suitable format for a run section word is shown broken out in FIG. 3, indicated as 310a.

The control program for computer 26 is maintained in read-only memories (e.g., EPROMS—not shown). In normal operation, an interrupt is generated in response to each machine cycle pulse (suitably by flip-flop 502 in the machine cycle monitor, as will be explained in conjunction with FIG. 5). A degree counter 330, suitably maintained in RAM 304a, is incremented in response to each interrupt. The degree counter 330 can be reset through software after 360 machine pulses or can be reset in response to a separate reset pulse generated by the machine (gob distributor), or both. Provisions can also be made to detect and correct for missed cycle (degree) pulses (i.e., a reset pulse occurs prior to 360 degree pulses) or missed reset pulses (i.e., more than 360 degree pulses, before a reset pulse).

After updating the degree counter 330, the respective status bytes 311 are scanned. More specifically, the machine cycle speed indicia from machine speed monitor 326, the respective battery status inputs from power distribution system 38, and the respective machine status inputs from sooner/later box 30 are scanned and the appropriate actions taken, as will be explained.

Assuming that the section is in proper running condition, Run Table 310 is then scanned, and each word containing a function degree field equal to the contents of degree counter 330 is output to effect the desired function through the designated driver. For example, after it has been ascertained that the section is in proper running condition, the address of the first word in Run Table 310 is loaded into a memory address pointer register 322 (typically a designated location in RAM 304A). The content of the function degree field of the designated Run Table word is then compared to the content of degree counter 330. If a favorable comparison is found, i.e., the function degrees equal the actual degree count, microcomputer 304 then applies signals (i.e., outputs) indicative of the driver address and on/off fields of the designated Run Table word to MUX 306. MUX 306 then provides the contents of the on/off field at the MUX output terminal (and thus the driver) corresponding to the content of the Run Table word driver address field. Memory address pointer 322 is then incremented, and the comparison is repeated with respect to the next successive word in Run Table 310. Where the comparison shows the content of Run Table word function degree field is not equal to the content of degree counter 330, the driver address field is not output by computer 304. This sequence is repeated until each word in Run Table 310 has been accessed. The speed of operation is such that, in the time frame of the machine cycle, the entire Run Table appears to be scanned substantially instantaneously and all functions for the degree count effected substantially concurrently. Each time degree counter 330 is again incremented (assuming proper status conditions), memory address pointer 322 is again set to the address of the first Run Table word, and the sequence is repeated to ultimately complete the machine cycle.

It should be appreciated that the machine cycle can be implemented using other standard data storage and retrieval techniques such as, for example, direct memory access, and linked list and single linked list techniques. In the case of the single linked list, for example, each data word would also contain a pointer to the word associated with the next successive function in the machine cycle. Rather than incrementing memory address pointer 322, the pointer would be loaded therein upon a favorable comparison.

In accordance with one aspect of the present invention, the operator is able to automatically preset (initialize) all of the functions in the section independently of machine cycle to eliminate necessity of the operator having to manually position the machine elements. The positioning of the elements (parts) is effected in a plurality of sequential steps. Each step entails substantially simultaneous movement of a plurality of non-conflicting parts and occurs a predetermined time period after the preceding step. The time period is chosen to ensure that all movements effected during the preceeding step have been completed before proceeding to the next step. The time sequence of the steps is thus independent of the gob distributor (machine) cycle.

The information necessary for the part positioning is contained in the job history and maintained in a port 312 of RAM 304a, hereinafter termed "parts position table" 312. Parts position table 312 is shown in broken out schematic form to illustrate a suitable format. Parts position table 312 is divided into a number of records. Each record corresponds to an individual step in the parts positioning routine and comprises a header byte 314 followed by a number of function identification bytes 316. Each header byte 314 includes a "No. Drivers" field indicative of the number of drivers (functions) to be addressed during the step, i.e., the number of function identification bytes in the record. The header byte 314 also includes a "unit time" field indicative of the delay period to be waited before proceeding to the next step. Each function identification byte 316 includes a "Driver address" field indicative of the MUX output address associated with the function to be effected and an on/off field to specify the particular action to be taken with respect to that driver.

In general, each of the functions specified in the record is effected in sequence. However, the speed of operation is such that the functions appear to occur substantially concurrently. After each of the functions specified in the record is effected, the requisite delay time is waited, then the next record operated upon.

More particularly, section computer 26 includes respective registers, time counter 318, and max number drivers counter 320 (suitably maintained in RAM 304a), and a 250 millisecond (quarter second) timer 324. The content of the header 314 unit time field corresponds to the number of time units (e.g., quarter seconds) in the predetermined delay. Timer 324 can be coupled to microcomputer 304 through multiplexer 306 or can be formed as an integral part of microcomputer 304. In operation, when the parts position routine is called, the address of the first byte in parts position table 312 (header byte 314) is loaded into memory address pointer 322. The contents of the "No. Drivers" field and unit time field of header byte 314 are then loaded into maximum number drivers counter 320 and time counter 318, respectively. Memory address pointer 322 is then incremented by one and the indicated memory location (function identification byte 316a) is accessed. Signals indicative of the function identification byte 316a are then generated by microcomputer 304 to multiplexer 306, which, in turn, generates a signal in accordance with the on/off field at the designated MUX output (and thus to the appropriate solenoid driver circuit 308) to effect the desired action. Memory address pointer 322 is then incremented and the maximum number drivers counter 320 is decremented. The next function information byte in sequence (316b) is then accessed and output by microcomputer 304 to effect the desired function. Memory address pointer 322 is again incremented and maximum number drivers counters 320 is again decremented. The foregoing sequence of steps is then repeated until the count in maximum numbers of driver counter 320 reaches zero, signifying that each of the functions to be effected during the parts positioning step has been effected. The next sequential byte in the parts positioning table is therefore a header byte. It should be appreciated that while the respective functions of the step are performed sequentially, the speed of operation is such that the functions appear to be performed substantially concurrently.

After all of the functions of the step have been performed, a predetermined delay period occurs before performing the functions of the next step. The predetermined delay is effected by time counter 318 and timer 324. When maximum number drivers counter 320 reaches a zero count, time counter 318 is then decremented in response to each quarter second signal generated by 250 millisecond timer 324.

When time counter 318 reaches a zero count, the predetermined delay period has been met, and memory address pointer 322 is incremented to access the next header (314a) in the parts positioning table. The previously described actions are then carried out with respect to the next record in the parts positioning table 312. The sequence is continued until indicia of the end of the table is reached.

If desired, memory space can be conserved where a large number of actions are to be effected during a given step by utilizing an alternate format. In one such alternative format, an information bit is maintained for each driver, specifying its desired state. The alternative format can be signified by, for example, setting the "No. Drivers" field of the header byte to zero. Each multiplexer output address is then generated in sequence, and a signal in accordance with the corresponding bit is supplied to the associated driver.

The parts positioning routine is thus independent of the actual machine (gob distributor) cycle. The respective elements of the individual machine sections can therefore be initialized very quickly without requiring running the machine through a number of cycles. The period of a cycle with respect to some of the larger wares (e.g., gallon bottles) can be considerable.

A program start provision utilizing the parts positioning routine is included in section computer 26 to allow for orderly start up of the section. Upon power up, in the general operation of the machine pulse interrupt routine, the status of the section is reviewed. If the section is not already running (as indicated by a section running status byte from sooner/later box 30), the battery condition (the status bytes from power distribution system 38) is checked, and the status byte indicative of proper reception of a job history (not shown) is checked. If proper section status is indicated, the machine start button status (the start button status byte from sooner/later box 30) is checked. If the start button has not been activated, the interrupt will exit, e.g., no further action will be taken. However, if the start button has been depressed, the program start routine will be executed. The parts positioning routine is first called to initialize positions of the respective elements. A particular function is designated in the job history (i.e., the address of the function in the Run Table is identified) as the "start function" which determines the point in the machine cycle after which signals will be generated to effect the various functions. When the contents of the degree counter 330 are equal to the contents of the function degree field of the Run Table word corresponding to the start function, the section computer 26 begins normal operation.

If desired, an additional safety feature which is incorporated in the preferred embodiment can be incorporated by requiring the operator to hold the start button down on the sooner/later box until normal operation is achieved. For a more detailed description of such safety feature, see the above noted patent to Kwiatkowski and Wood.

A programmed stop routine utilizing the parts positioning routine is also provided. The programmed stop routine cuts off the glass supply to the section and allows the section to form ware from a glass already in the machine before stopping. Various programmed stop routines may be utilized to stop the particular section elements (functions) at different positions to allow for maintenance work. Respective functions are designated in the job history to mark the beginning and end of the machine cycle. In general, when a programmed stop is to be effected, the glass to the section is first turned off, the machine cycle monitored to determine when all of the wares have been output by the section, then the parts positioning routine executed.

Upon beginning a programmed stop, the first action taken is to inhibit further glass from entering the section. This is typically done by inhibiting the "scoop on" function. To monitor the machine cycle, a plurality of functions in the cycle are designated in the job history. The first (hereinafter referred to as the "mark" function) indicates the beginning of the cycle (e.g., reception of the gob by the section). The last (hereinafter referred to as "stop") indicates the point in the cycle where glass is cleared from the machine. Intermediate functions (stop 1, stop 2) correspond to intermediate points in the cycle. The intermediate points are necessary because it typically takes two to three machine cycles to clear the glass from the machine. The programmed stop routine monitors the machine cycle for the designated functions in sequence, i.e., first looks for the mark function, then stop 1, then stop 2, then stop. For example, the mark function could occur at 10°, stop 1 at 300°, stop 2 at 180°, and stop at 350°. Absent the detection of the intermediate functions, the machine would be stopped only 350° into the first cycle, leaving glass in the machine. However, by first detecting the mark function at 10°, then detecting the stop 1 function at 300°, thereafter detecting the stop 2 function when the machine next reaches 180°, and only then stopping the machine when the stop function is detected when the machine reaches 350°, it is ensured that glass will be cleared from the machine. The parts positioning routine is then called to initialize the respective section functions. It should be appreciated that various and different parts position tables 312 can be utilized, for example, for the start and stop programs or for respective programmed stops to facilitate maintenance of various elements of the section. A plurality of such tables can be maintained, if desired, in RAM 304a for selective access.

Figure 4:
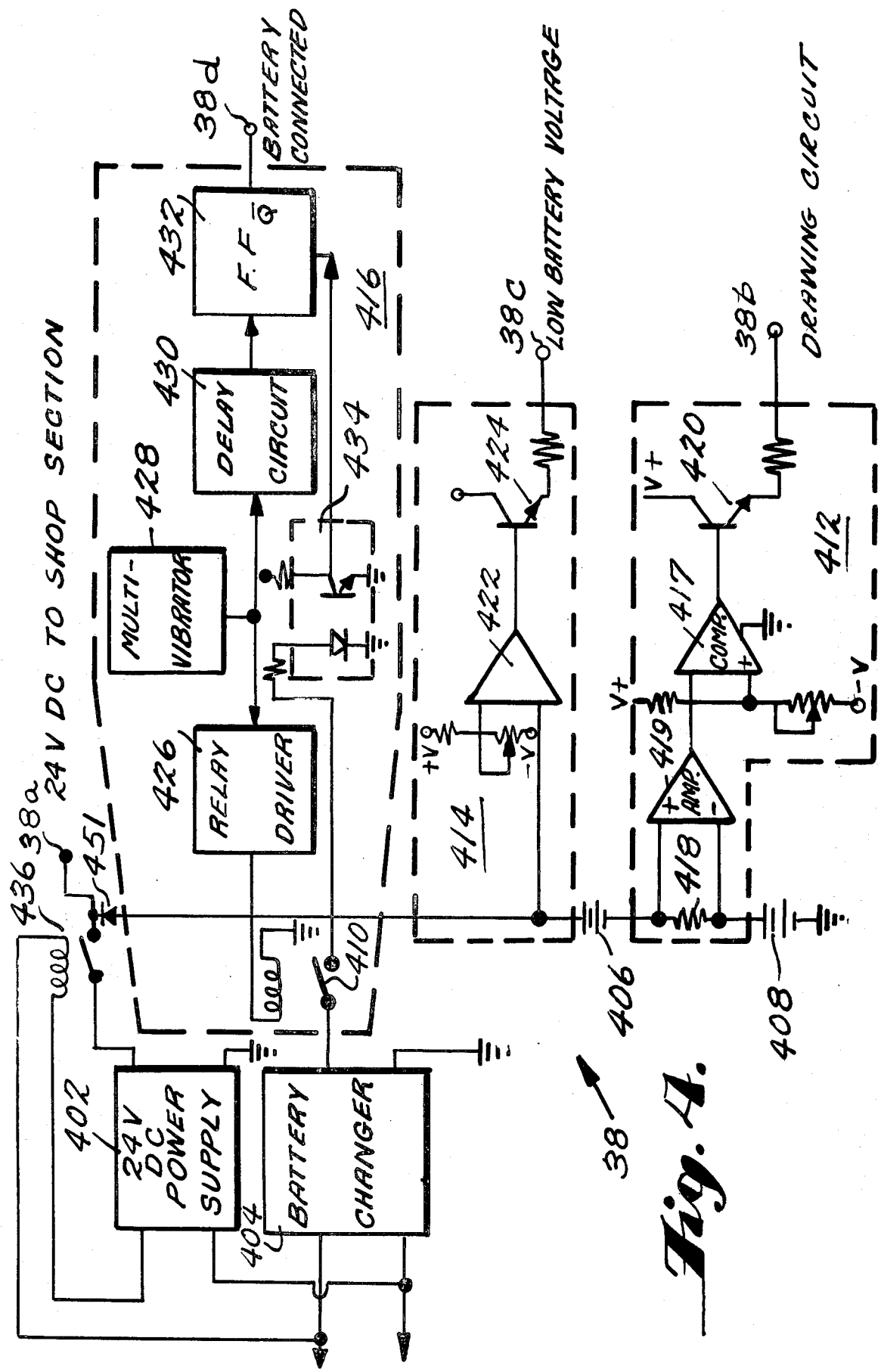
FIG. 4 is a block schematic diagram of a power failure detection system in accordance with the present invention.

Referring now to FIG. 4, power distribution system 38 will now be described. A conventional 24-volt DC power supply 402 is connected to a 115-volt AC power line (source). Also connected to the 115-volt AC line is a conventional battery charging DC supply (e.g., a Lamda type 28-volt DC supply) 404. Battery charger 404 is connected to a bank of two series connected 12-volt batteries 406 and 408 through a relay 410. (Relay 410 is part of a battery presence monitor 416, as will be explained.) Batteries 406 and 408 are suitably sealed 12-volt automotive batteries. Connected to batteries 406 and 408 are a suitable current draw monitor 412, a voltage level monitor 414, and battery presence detector 416.

Current draw monitor 412 generates a signal at terminal 38b to indicate that a current is being drawn from batteries 406 and 408. Current draw monitor 412 suitably comprises a shunt resistor 418, a differential amplifier 416, a comparitor 417, and a driver transistor 420. Shunt resistor 418 is connected in series with batteries 406 and 408. The respective positive and negative terminals of differential amplifier 419 are connected across resistor 418 to provide a voltage output in accordance with the voltage drop across resistor 418. The voltage drop across resistor 418 is directly proportional to the current through the resistor. The output of differential amplifier 419 is, in turn, applied to comparitor 417. When the voltage across (and thus current through) resistor 418 exceeds a predetermined level, comparitor 417 generates a signal to turn on driver transistor 420 thus causing an appropriate signal to be generated at terminal 38b.

Battery voltage monitor 414 generates a signal at terminal 38c when the battery voltage falls below a preset threshold value. Battery voltage monitor 414 suitably comprises a comparitor 422 and driver transistor 424. The positive input of comparitor 422 is connected to the positive terminal of battery 406. A reference voltage is applied to the negative input terminal of the comparitor. Comparitor 422 generates a signal to activate driver transistor 424 when the voltage of batteries 406 and 408 drop below the preset threshold level. Thus, when the battery voltage drops below the threshold level, an appropriate signal is generated at terminal 38c.

Battery presence monitor 416 generates a signal at terminal 38d to indicate that the batteries are properly connected in the circuit. Presence monitor 416 comprises relay 410, suitable driver circuitry 426, a multi-vibrator 428, a delay circuit 430, a d-type flip-flop 432, and an optoisolator 434. Multi-vibrator 428 (suitably a 100 Hz square wave oscillator with a 90% duty cycle) controls the operation of relay 410 such that trickle charger 404 is connected to batteries 406 and 408 on the order of 90% of the time. When multi-vibrator 428 generates the signal to open relay 410, battery presence monitor 416 is isolated from charger 404 to provide a true indication of whether the batteries are properly connected. The data input (D) of flip-flop 432 is connected to the positive terminal of battery 406 through optoisolator 434. When relay 410 disconnects battery charger 404 from batteries 406 and 408, the output of optoisolator 416 becomes indicative of the presence of batteries 406 and 408. When batteries 406 and 408 are properly connected, current flows through the LED of optoisolator 434, rendering the optoisolator phototransistor conductive and thus presenting a low level signal to the D input of flip-flop 432. Conversely, if batteries 406 and 408 are not properly connected, the optoisolator LED will not emit light, turning off the phototransistor and providing a high level signal to the D input of flip-flop 432.

When multi-vibrator 428 generates a signal to open relay 410, the signal is also applied through delay circuit 430 to the clock input of flip-flop 432. Delay 430 allows time for the signal applied to the D input of flip-flop 432 to settle. Accordingly, the Q output of flip-flop 432, connected to terminal 38d, assumes a status opposite to that applied to the D input terminal. Thus, a high level signal is provided at terminal 38d when batteries 406 and 408 are properly connected, and a low level signal is provided when they are not properly connected.

As previously noted, power distribution system 38 provides power to shop computer 24, the respective section computers 26, and sooner/later box 30. A 24-volt DC power signal is provided at terminal 38a. Power is normally provided by 24-volt power supply 402, but is provided by batteries 406 and 408 in the absence of an AC signal. Terminal 38a is connected to power supply 402 thru contacts of relay 436. The control coil for relay 436 is interjected into the AC line. When an AC signal is present, the relay is activated to connect DC power supply 402 to terminal 38a. When no AC signal is present, the relay drops out and diode 437 applies voltage from batteries 406 and 408 to terminal 38a.

Referring again to FIG. 1, as previously noted, the DC power signal provided at terminal 38a is coupled to the shop computer, respective section computers, and the sooner/later box through a relay 40. The control coil 42 for relay 40 is coupled to a hard wired OR gate 44 having an input connected to an assigned output port of MUX 306 (FIG. 3) of each section computer 26. OR gate 44 is suitably formed of a plurality of transistors, one associated with each section computer 26, with base connected to the section computer MUX output, collector connected to coil 42 and emitter grounded. So long as one of the transistors is conductive, a current path for coil 42 is completed. When all of the transistors are rendered non-conductive, current through coil 42 ceases and relay 40 opens. This allows one or more section computers to be turned off and removed without disrupting the operation of the remaining sections.

Now referring to FIG. 3, the current drawn signal provided at terminal 38b, the battery voltage signal provided at terminal 38c, and the battery connected signal provided at terminal 38d are provided through hard-wired connections to corresponding bits in the buffer register 309 of each of the section computers 26. Respective flags in the section status bytes 311 of computer 26 memory are set accordingly. As previously noted, the operating program of section computer 26 periodically scans the battery status flags and effects appropriate action in accordance with the flag condition. For example, where the flags indicate a full battery voltage condition and no battery current drawn, the machine is deemed operational and no action is taken. Where a low battery voltage is detected but no current drawn, the machine is still deemed operational, but a low voltage bit is set in the section status computer word maintained in the shop computer 24 for subsequent communication to console 12.

Where a full battery voltage condition is shown, but battery current is indicated as drawn, respective timers 328 and 332 are triggered to count off first and second periods (e.g., one to five seconds and 30 minutes respectively). If the battery current draw condition is still present at the end of the first predetermined period, a programmed stop of the section (if still running) is effected and restart of the section inhibited until the battery current draw condition is corrected. Waiting a short predetermined period after detection of a power outage before stopping the machine prevents shut down due to spurious, momentary fluctuations in the AC line current. Even if affected by a power outage, the compressor system providing pressurized air to the respective machine elements should include enough pressure storage capacity to run the machine for the one to five second period and to effect a programmed stop. If desired, the stoage capacity of the pneumatic system can be increased with auxiliary pressure tanks.

If the battery current condition is not corrected within the thirty minute period the transistor of OR gate 44 associated with the section is rendered non-conductive. It should be recalled that MUX 306 is formed by a matrix of addressable latches, and a bit in one of those latches provides the signal to the OR gate transistor. When the section is in running status, the MUX latch bit content is maintained at logic one. At the end of the thirty minute period, computer 304 addresses and resets the MUX running status bit to provide a low level signal to OR gate 44. When all sections have generated low level running status signals to OR gate 44, coil 42 (FIG. 1) is deactivated, relay 40 opens, and the batteries are disconnected from shop 14.

If a low battery voltage condition is shown, together with a battery current draw condition, the section, if running, is emergency stopped, restart is inhibited, and a low level running status signal is generated. The batteries are thus ultimately disconnected.

Where an improper battery connection condition is indicated by a battery bit in status bytes 311, the section, if running, is emergency stopped, restart is inhibited, and a low level section running status signal is generated. Manual override and initialization provisions for the power distribution system can be included, if desired.

As previously noted, the actual speed of the machine cycle is monitored to provide for orderly shutdown of the machine in the event that the gob distributor mechanism or the machine speed pulse generating mechanism loses power or malfunctions. In the preferred embodiment of the present invention, a single pulse generator is utilized for all of the individual sections in the shop and the machine cycle pulses are passed through the shop computer to each of the individual sections. Each individual section computer 26 includes a machine speed monitor 326.

In general, the frequency of the machine cycle speed pulses is monitored and the section emergency stopped when the frequency drops below a predetermined minimum (10 Hz).

Figure 5:
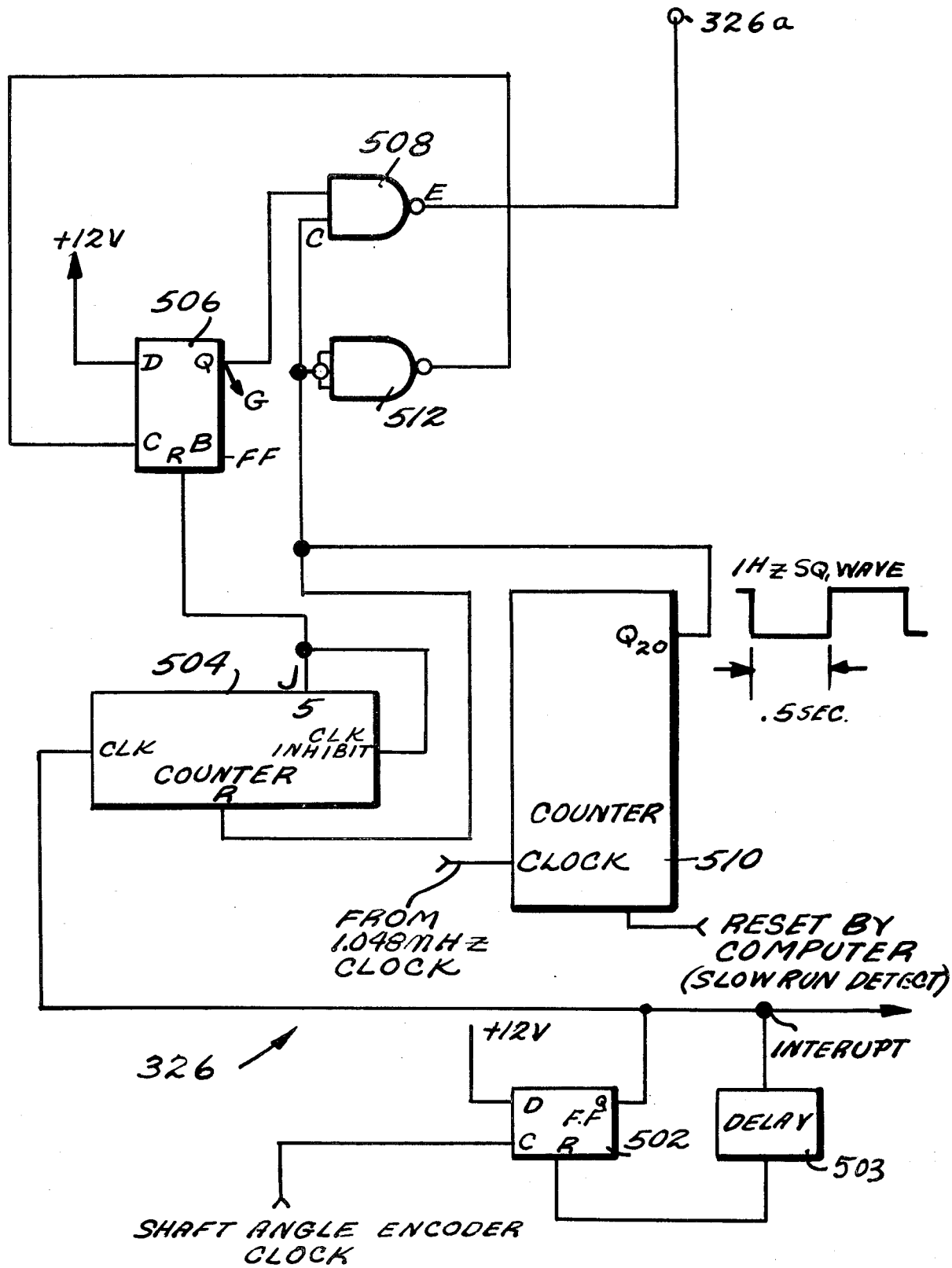
FIG. 5 is a block schematic diagram of a suitable machine speed monitor.

Referring now to FIG. 5, the preferred embodiment of machine speed monitor 326 will now be described. The machine cycle pulses (e.g., shaft angle encoder clock pulses) are applied to the clock input of a D-type flip-flop 502. The "D" input of the flip-flop 502 is tied high. Flip-flop 502 is thus set by the encoder pulse. Flip-flop 502 is reset a predetermined time period thereafter by feeding back the Q output through a delay 503. In practice the delay is effected by the section computer. That is, flip-flop 502 is reset by a signal generated by microcomputer 304 (FIG. 3) after a predetermined period (much less than the period between shaft angle clock pulses). As previously noted, flip-flop 502 is utilized to generate a machine cycle pulse interrupt to computer 304. Thus, it is desirable to reset the flip-flop to remove the source of the interrupt from the computer.

The Q-output of flip-flop 502 is applied as a clock input to a five-stage counter 504. The fifth stage output of 504 is coupled to the reset input (R) of a d-type flip-flop 506. The d-input of flip-flop 506 is tied high. The Q-output of flip-flop 506 is applied to one input of a two input NAND gate 508. The other input of NAND gate 508 is coupled to the Q-20 output of a frequency divider (counter) 510, which is clocked by a 1.048 MHz oscillator (not shown).

Counter 510 generates a square wave having a frequency of approximately 1 Hz. The 1 Hz signal is also applied as a reset signal to counter 504, is inverted by inverter 512, is applied as a clock signal to flip-flop 506.

In operation, divider/counter 510 is reset to zero by the computer upon power up of the system. The low level signal thus provided at the Q-20 output forces NAND gate 508 to generate a high level signal at terminal 326a.

During normal operation (during which the shaft encoder pulse occurs at a frequency greater than 10 Hz), the output of NAND gate 508 (provided at terminal 326a) is maintained at a high level. More particularly, during the period (one-half second) that the 1 Hz signal from counter 510 is low, counter 504 is incremented by each machine cycle degree (shaft encoder) pulse. If five shaft encoder pulses occur before the 1 Hz square wave from counter 510 goes high, counter 504 will reset flip-flop 506 causing the Q-output thereof to go low. Accordingly, low level signals will be applied to at least one input of NAND gate 508, forcing the output thereof provided at terminal 326a to remain high, even after the 1 Hz square wave goes high. However, if five encoder pulses do not occur during the half second period to reset flip-flop 506 when the 1 Hz square wave goes high, high level signals will be concurrently applied at the input terminals of NAND gate 508 by flip-flop 506 and counter 510. Accordingly, the output signal of NAND gate 508 will go low.

Thus, a high level signal is provided at terminal 326a so long as the machine cycle speed is above 10 Hz, and a low level signal is provided when the machine speed drops below the 10 Hz threshold.

The power failure detection system of the present invention significantly decreases machine downtime due to power outages. Waiting the first predetermined time period after first detecting a power outage before stopping the machine allows the machine to ride over momentary power fluctuations and thus prevents unnecessary downtime. At the same time, however, the battery backup (and pressure storage in the pneumatic system) ensures an orderly shut down of the machine if necessary. The machine cycle independent parts positioning routine provides for a faster programmed stop and thus facilitates performing the programmed stop on the pneumatic system reserve (stored pressurized air) if necessary. Moreover, when shut down becomes necessary, even on an emergency basis the battery backup system preserves the contents of the respective section and shop computer RAM's to avoid the necessity of reloading the system. Further, the parts positioning routine provides for automatic initialization of the section elements, eliminating the necessity for manual inspection and positioning of the elements, and thus reducing the down time of the section.

The battery backup period, is limited to a predetermined period (e.g., 30 minutes) to prevent the batteries from being damaged. To this end, if a low battery voltage is detected during the 30 minute period the batteries are disconnected from the system. Even when the batteries are disconnected from the system, however, storage of the job histories in the shop computer nonvolatile memory permits automatic reloading of the system without requiring the central console (operator) to reconstruct the memory contents from the job history library. Thus, set up time upon resumption of power is significantly reduced.

It will be understood that while various conductors/connections are shown in the drawing as single lines, they are not so shown in a limiting sense, and may comprise plural conductors or connections as is understood in the art. Further the above description is of preferred exemplary embodiments of the present invention, and the invention is not limited to the specific form shown. For example, one of the section computers could, if desired, perform the functions of shop computer 24. In other words, shop computer 24 could be integrated with one of the section computers 26. In such case, a common CPU would cooperate with an expanded memory in that section computer. Similarly, various functions of the section computers may be, if desired, performed in the shop computer 24. These and other modifications may be made without departing from the spirit of the invention as expressed in the appended claims.

We claim:

1. In an electronic controller for a glassware forming machine, said machine being periodically receptive of molten glass and including a plurality of separately movable elements, said controller selectively effecting movement of said elements in timed relation to form rigid glassware from said molten glass, said controller including a primary power supply to develop electrical power signals of a predetermined voltage for said controller, said controller further including means, responsive to stop signals applied thereto, for halting the operation of said machine in a manner such that removal of molten glass from said elements is facilitated; the improvement wherein said controller further includes:

a battery;
means for selectively connecting said battery to provide said power signals to said controller in the event that the primary power supply fails to provide such power signals; and
means for sensing the condition of said battery and for generating a stop signal in the event that said battery provides said power signals for more than a predetermined length of time.

2. The electronic controller of claim 1 wherein said means for sensing a predetermined state of said battery comprises means for detecting proper electrical connection of said battery to said controller means.

3. The electronic controller of claim 1 wherein said means for sensing a predetermined state of said auxiliary battery comprises means for comparing the voltage of said battery to a threshold value and for detecting when said voltage falls below said threshold value.

4. The controller of claim 1 wherein said controller further includes:

means for decoupling said battery from said controller at the end of a second predetermined length of time.

5. The controller of claim 1 wherein said machine includes at least one independent section, each section being periodically receptive of molten glass and including a plurality of separately movable elements, and wherein said controller comprises:

a respective section computer associated with each individual section for selectively effecting movements of said associated individual section elements, each said section computer generating a running status signal indicative of the running status of said section computer;
means for selectively connecting one of said primary power supply and said battery to a power terminal in accordance with operation of said primary power supply;
means, responsive to the running status signals from each section computer, for selectively coupling each section computer to said power terminal in accordance with the respective running status of said computer;
means for generating at least one signal indicative of the condition of said battery, said battery condition signal being applied to each said section computer;
each section computer including means, responsive to said condition signal, for generating said stop signal in the event said battery provides said power signals for more than a predetermined period of time, and for generating, a second predetermined period thereafter, a running status signal to enable decoupling of said section computer from said power terminal.

6. In a glassware forming machine having at least one section of the type selectively receptive of molten glass and including a plurality of respective separately movable elements, said machine including control means for controllably effecting movement of said elements in timed relation to form rigid glassware from molten glass, said control means including electronic components responsive to power signals of predetermined voltage from a primary power supply;

programmed stop means, responsive to a programmed stop signal, for stopping receipt of said molten glass and effecting a predetermined programmed stop sequence of element movements, whereby operation of the section is stopped only after all previously received molten glass has been cleared from the section;
an emergency stop means, responsive to an emergency stop signal, for effecting an immediate halt to element movement in the section and for placing said elements in a condition to facilitate clearing of said molten glass from said elements;
the improvement wherein said control means further includes:
an auxiliary power source for selectively providing said power signal when said primary power supply fails to provide said power signal;
means, cooperating with said auxiliary power source, for sensing provision of said power signal by said auxiliary power source and for generating a selected one of said programmed stop signal and emergency stop signal, if said auxiliary power source provides said power signal for more than a predetermined time period.

7. In a glassware forming machine having at least one section of the type selectively receptive of molten glass, said machine including a plurality of respective separately operable elements, said machine including control means for controllably effecting operation of the respective elements in cyclical timed relation to form rigid glassware from said molten glass, said control means including programmed stop means for controllably stopping receipt of said molten glass and effecting a programmed stop, said programmed stop comprising a predetermined sequence of element movements to stop operation of the section only after clearing all previously received molten glass from the section; the improvement wherein said programmed stop means includes:
- means for detecting when all previously received molten glass has been cleared from said elements and for responsively generating a positioning signal; and
- means, responsive to said positioning signal, for effecting substantially concurrent movements of respective groups of non-conflicting ones of said elements to stop operation of the section with said respective elements in respective predetermined positions.

8. A glassware forming machine comprising:
- at least one section including a plurality of separately operable elements;
- feeder means for periodically applying molten glass to said section;
- controller means, cooperating with said section and said feeder means, for controllably effecting operation of said elements in a cyclical timed sequence to form rigid glassware in normal operation from molten glass applied to said section;
- synchronization means for maintaining synchronism between said controller means and said feeder means during normal operation; and
- positioning means for effecting operation of said elements independently of said synchronization means;
- wherein said controller means further includes:
- programmed stop means for inhibiting said feeder means and for halting operation of said elements only after all previously applied molten glass is cleared from said elements, said programmed stop means comprising means for generating a programmed stop signal;
- means responsive to said programmed stop signal for inhibiting said feeder means; and
- means for sensing a predetermined operation by said elements indicative of the clearing of all previously applied molten glass from said elements and for effecting operation of said positioning means; and wherein
- said machine further includes:
- a primary power supply, and an auxiliary battery for providing power to at least said controller means in the event of the failure of said primary power supply to provide said power, and wherein said means for generating said programmed stop signal includes means for sensing a predetermined state of said auxiliary battery.

9. The machine of claim 8 wherein said means for sensing a predetermined state of said auxiliary battery comprises means for detecting a current draw from said battery.

10. The machine of claim 9 wherein said means for sensing a predetermined state of said auxiliary battery also comprises means for comparing the voltage of said battery to a threshold value and for detecting when said voltage falls below said threshold value.

11. The machine of claim 10 wherein said means for sensing a predetermined state of said battery further comprises means for detecting proper electrical connection of said battery to said controller means.

12. The machine of claim 9 wherein said means for sensing a predetermined state of said battery also comprises means for detecting proper electrical connection of said battery to said controller means.

13. In an electronic controller for a glassware forming machine, said machine being periodically receptive of molten glass and including a plurality of separately movable elements, said controller selectively effecting movement of said elements in timed relation to form rigid glassware from said molten glass, said controller including a primary power supply to develop electrical power signals for said controller of a predetermined voltage, said controller further including means, responsive to stop signals applied thereto, for halting the operation of said machine in a manner such that removal of molten glass from said elements is facilitated; the improvement wherein said controller further includes:
- a battery;
- means for selectively coupling one of said primary power supply and said battery to provide power signals to said controller in accordance with the operation of said primary power supply;
- means for generating a current draw signal indicative of a current draw from said battery;
- means, responsive to said current draw signal, for generating a first timing signal indicative of current being drawn from said battery for more than a first predetermined period; and
- means, responsive to said first timing signal for generating said stop signal.

14. In a glassware forming system of the type including at least one section comprising a plurality of separately movable elements periodically receptive of molten glass;
- an electronic controller, responsive to power signals of a predetermined voltage, for generating signals to controllably effect movement of said elements in timed sequence to form rigid glassware from said molten glass;
- a primary power supply for generating said power signals;
- programmed stop means, responsive to a programmed stop signal, for stopping receipt of said molten glass and for stopping movement of said elements only after all previously received molten glass has been operated upon and cleared from the section; and
- emergency stop means, responsive to an emergency stop signal, for effecting an immediate halt to said timed sequence of element movement;
- the improvement wherein said system further comprises:
- a battery;
- means for selectively coupling said battery to provide said power signal to said controller in the event of an outage of said primary power supply;
- means for generating first indicia of a current drawn from said battery;
- means for generating second indicia of the voltage level of said battery; and
- means, responsive to said first and second indicia, for detecting current drawn from said battery for a period of a duration longer than a first predetermined period, and for responsively generating one of said programmed stop and emergency stop signals in accordance with said second indicia.

15. The system of claim 14 further including:
means for generating third indicia of the state of electrical connection of said battery; and
means, responsive to said third indicia, for generating said emergency stop signal upon an indication of improper connection of said battery.

16. The system of claim 14 of 15 further comprising: means for charging said battery.

17. The system of claim 15 further including charging means for charging said battery, and wherein said means for generating third indicia comprises means for periodically disconnecting said charging means from said battery; and
means for generating a signal indicative of the voltage level of said battery with said charging means disconnected, whereby the connection of said battery into said system is monitored.

18. The controller of claim 1, 5 or 13 wherein said controller is receptive of machine cycle signals indicative to the speed of cyclical operation of said machine, and said controller further comprises machine cycle monitoring means, responsive to said machine cycle signal, for generating said stop signal in the event the speed of cyclical operation of said machine is not in accordance with at least one threshold value.

19. The controller of claim 6, 14, 15 or 17 wherein said controller is receptive of machine cycle signals indicative of the speed of cyclical operation of said section, and said controller further comprises machine cycle monitoring means, responsive to said machine cycle signal, for generating said emergency signal in the event the speed of cyclical operation of said machine is not in accordance with at least one threshold value.

20. In a controller for a glassware forming machine, said machine including at least one section cyclically receptive of molten glass and comprising a plurality of groups of separately movable elements, said controller in normal operation including means for selectively generating signals to said section to effect movement of said separately movable elements in a timed sequence in synchronism with reception of said molten glass to form rigid glassware from said molten glass, the improvement wherein said controller includes:
means, responsive to positioning indicia, for moving said elements into predetermined positions asynchronously from said molten glass reception cycle, said moving means including first means for moving each of said separately movable elements which comprise a particular group substantially simultaneously, and second means for moving said plurality of groups of separately movable elements in a plurality of sequential steps, said moving means including means for providing a time period between the movement of each of said plurality of groups of separately movable elements.

21. The controller of claim 20 wherein said moving means includes means for providing a predetermined time period between the movement of each of said plurality of groups of separately movable elements.

22. The controller of claim 21 wherein said moving means comprises:
a memory including at least one record, each record comprising a respective accessible location corresponding to each element in a respective group of elements, each location containing indicia of the desired position of the corresponding element, said record including indicia of the predetermined time period to be enacted before effecting movement of another group of elements;
means, initially responsive to said position indicia and responsive to increment signals applied thereto for identifying a record to be accessed;
means for accessing each location in said record to be accessed and for generating signals to effect movement of said corresponding elements; and
means for generating said increment signal at the end of a delay period in accordance with the indicia of the predetermined time period included in said record to be accessed, to change the record to be accessed.

23. The controller of claim 21 wherein said moving means comprises:
a memory including a plurality of sequenced bytes, grouped in a plurality of sequenced records, each said record comprising
a header byte followed in sequence by a predetermined number of function information bytes, said header byte including indicia of said predetermined number of function information bytes in said record and indicia of said predetermined time period associated with said record;
each said function information byte including indicia of an element and indicia of a desired position for said element;
time counter means for selectively receiving header time period indicia and generating a delay completed indicia at a time in accordance with said predetermined time period;
function counter means, selectively receptive of header predetermined number indicia and responsive to a function executed indicia, for generating a record completed indicia when the number of functions executed in respect of a record is equal to said predetermined number;
memory pointer means, responsive to advance signals applied thereto, for sequentially accessing the respective bytes in said memory, said memory pointer means accessing the header byte of the first record in sequence in response to said positioning indicia;
means, responsive to accessed header bytes, for loading said time counter means with said accessed header time period indicia and said function counter means with said accessed header predetermined number indicia;
means, responsive to accessed function information bytes, for generating an output signal to effect movement of the element identified in said accessed function information bytes to the identified desired position, and for responsively generating said function executed signal to said function counter means; and
means, responsive to said function executed indicia, said record completed indicia and said delay completed indicia, for selectively generating said advance signals to said memory pointer means to effect accessing of each function information byte in a given record time period, and thereafter for effecting accessing of the header bytes of the next sequential record only after a delay period in accordance with said predetermined time period associated with said given record.

24. In an electronic controller for a glassware forming machine, said machine including at least one unit periodically receptive of molten glass, said unit comprising a plurality of separately movable elements, a controller for selectively generating signals to effect a machine cycle comprising operation of said elements in timed cyclical relation in synchronism with said reception of molten glass to form rigid glassware from said molten glass, said controller being receptive of machine cycle signals indicative of advancement in said machine cycle, said controller further including stop means, responsive to a stop signal, for halting said timed sequence of element operation;

the improvement wherein said controller includes machine cycle monitoring means, responsive to said machine cycle signals, for generating said stop signal if the machine cycle speed drops below a predetermined threshold.

25. The electronic controller of claim 24 wherein said machine cycle monitoring means comprises means for monitoring the frequency of said machine cycle signals, and wherein said stop means includes means for halting said timed sequence of element operation when said frequency drops below a predetermined minimum.

26. The electronic controller of claim 25 wherein said predetermined minimum comprises 10 Hz.

27. A glass forming system comprising at least one cyclically operable individual molding machine section including a plurality of separately operable elements;

feeder means for periodically applying molten glass to each said molding machine section; and a section computer means associated with each said molding machine section for generating signals to its respective molding machine section to effect cyclical operation of said elements in its respective molding machine section in synchronism with said feeder means, to form rigid glassware from said applied molten glass;

each said section computer means comprising multiplexer means including a plurality of outputs, said multiplexer means including means responsive to address signals indicative of said outputs and data input signals applied thereto, for generating MUX output signals indicative of said data input signals, at the output indicated by said address signals;

a plurality of element driver means, at least one of said plurality of element driver means being associated with each of said plurality of elements in said respective molding machine section or generating signals to effect operation of said elements in accordance with driver data signals applied thereto;

means for coupling each of said plurality of element driver means to a multiplexer means output, said MUX output signals being applied thereto as said driver data signals;

a run table memory including a plurality of sequenced memory locations, at least one of said plurality of memory locations corresponding to each operation in said cyclical operation of said elements;

means for loading each of said run table memory locations with cycle point indicia of the relative point in said cyclical operation of said elements when the corresponding operation is to be effected; multiplexer output indicia of the multiplexer output corresponding to the element driver means associated with the element on which said corresponding operation is to be effected, and data signal indicia of the data signals for effecting said corresponding operation;

means connected to said multiplexer means for generating a machine cycle signal indicative of increments of advancement of said mold machine section through said cyclical operation of said elements;

means, responsive to said machine cycle signal, for generating a machine cycle count indicative of the instantaneous cyclical position of said mold machine section;

means, responsive to said machine cycle signal, and said machine cycle count, for selectively accessing said run table memory locations and for comparing said cycle point indicia of said accessed run table locations to said machine cycle count; and means responsive to a favorable comparison for generating signals indicative of said multiplexer output indicia and said data signal indicia to said multiplexer means as said address input signal and data input signal, respectively.

28. The system of claim 27 wherein said means for loading comprises:

a central console, associated with a plurality of glass forming shops, each said shop including at least one said individual molding machine section and associated section computer means, said central console including a stored library of job histories, each said job history including, with respect to each operation in a cyclical operation to form an associated type of ware, cycle point indicia of the relative point in said cyclical operation of said elements when the operation is to be effected, multiplexer output indicia of the multiplexer output associated with the element on which the operation is to be effected, and data signal indicia of the data signals for effecting the operation; and means for selectively communicating a designated job history to a specified section computer means run table memory.

29. The system of claim 28 wherein said means for selectively communicating includes a respective shop computer means, associated with each glass forming shop, for selectively receiving job history communications from said central console to respective designated section computer means in said shop, and for selectively generating signals indicative of said received job histories to load the designated section computer run table memory.

30. The system of claim 29 wherein said shop computer means includes:

a non-volatile memory for storing indicia of said received job histories;

a non-volatile section status word for storing indicia of whether the designated section computer means run tables have been loaded with the stored job history indicia in said non-volatile memory; and means, responsive to said section status word, for, upon power up of said glass forming shop, selectively loading said section computer means run tables with said stored job history indicia without communication from said central console.

31. The system of claim 27 wherein each section computer means further includes:

means, responsive to a positioning signal applied thereto, for effecting movement of said elements independently of said machine cycle signal; and means for selectively generating said positioning signal.

32. The system of claim 31 wherein said section computer means includes:
programmed stop means for inhibiting said feeder means and for halting operation of said elements only after all previously applied molten glass is cleared from said elements, said programmed stop means comprising:
means for generating a programmed stop signal;
means, responsive to said programmed stop signal, for inhibiting said feeder means; and
means for sensing a predetermined operation by said elements indicative of the clearing of all previously applied molten glass from said elements and, in response thereto, for generating said positioning signal.

33. A glass forming system, comprising
at least one cyclically operable individual molding machine section including a plurality of separately operable elements;
feeder means for periodically applying molten glass to each said molding machine section; and
a section computer means associated with each said molding machine section for generating signals to its respective molding machine section to effect cyclical operation of said elements in its respective molding machine section in synchronism with said feeder means to form rigid glassware from said applied molten glass;
each said section computer means comprising;
multiplexer means including a plurality of outputs, said multiplexer means including means responsive to address signals indicative of said outputs and data input signals applied thereto, for generating MUX output signals indicative of said data input signals, at the output indicated by said address signals;
a plurality of element driver means, at least one of said plurality of element driver means being associated with each of said plurality of elements in said respective molding machine section for generating signals to effect operation of said elements in accordance with driver data signals applied thereto;
means for coupling each of said plurality of element driver means to a multiplexer means output, said MUX output signals being applied thereto as said driver data signals;
a run table memory including a plurality of sequenced memory locations, at least one of said plurality of memory locations corresponding to each operation in said cyclical operation of said elements;
means for loading each of said run table memory locations with cycle point indicia of the relative point in said cyclical operation of said elements when the corresponding operation is to be effected, multiplexer output indicia of the multiplexer output corresponding to the element driver means associated with the element on which said corresponding operation is to be effected, and data signal indicia of the data signs for effecting said corresponding operation;
means connected to said multiplexer means for generating a machine cycle signal indicative of increments of advancement of said mold machine section through said cyclical operation of said elements;

means, responsive to said machine cycle signal for generating a machine cycle count indicative of the instantaneous cyclical position of said mold machine section;
means, responsive to said machine cycle signal, and said machine cycle count, for selectively accessing said run table memory locations, and for comparing said cycle point indicia of said accessed run table locations to said machine cycle count;
means responsive to a favorable comparison for generating signals indicative of said multiplexer output indicia and said data signal indicia to said multiplexer means as said address input signal and data input signal, respectively; and wherein said system further includes:
a primary power supply to develop electrical power signals of a predetermined voltage for said section computers;
a battery;
means for selectively connecting said battery to provide said power signals to said section computer means in the event that the primary power supply fails to provide such power signals;
means for sensing the condition of said battery, and for generating a stop signal in the event that said battery provides said power signals for more than a predetermined length of time; and
means, responsive to said stop signals, for halting the operation of said mold machine section in a manner such that removal of molten glass from said elements is facilitated.

34. The system of claim 33 wherein each said section computer means further includes means for generating a running status signal indicative of the running status of said section computer means; and wherein
said system further includes:
means for selectively connecting one of said primary power supply and said battery to a power terminal in accordance with operation of said primary power supply;
means, responsive to the running status signals from each section computer means in said system, for selectively coupling each section computer means to said power terminal in accordance with the respective running status of said section computer means;
means for generating at least one signal indicative of the condition of said battery, said battery condition signal being applied to each said section computer means of said system; and
each section computer means including means, responsive to said condition signal, for generating said stop signal in the event said battery provides power for more than a predetermined period of time, and for generating, a second predetermined period thereafter, a running status signal to enable decoupling of said section computer from said power terminal.

35. The controller of claim 33 wherein each section computer means includes
positioning means, responsive to positioning indicia, for effecting movement of said elements into predetermined positions asynchronously from the periodic application of molten glass from said feed.

36. The controller of claim 35 wherein said positioning means comprises:
a memory including at least one record, each record comprising a respective accessible location corresponding to each element in a respective group of elements, each location containing indicia of the desired position of the corresponding element, said record including indicia of a predetermined requisite delay period to be enacted before effecting movement of another group of elements;

means, initially responsive to said positioning indicia and responsive to increment signals applied thereto for identifying a record to be accessed;

means for accessing each location in said record to be accessed and for generating signals to effect movement of said corresponding elements; and means for generating said increment signals at the end of a delay period in accordance with the indicia of requisite delay included in said record to be accessed to change the record to be accessed.

37. The controller of claim 35 wherein said positioning means further comprises:

a memory including a plurality of sequenced bytes grouped in a plurality of sequenced records, each said record comprising a header byte followed in sequence by a predetermined number of function information bytes, said header byte including indicia of said predetermined number of function information bytes in said record and indicia of a predetermined time period associated with said record;

each said function information byte including indicia of an element and indicia of a desired position for said element;

time counter means for selectively receiving header time period indicia and generating a delay completed indicia at a time in accordance with said predetermined timer period;

function counter means, selectively receptive of header predetermined number indicia and responsive to a function executed indicia, for generating a record completed indicia when the number of functions executed in respect of a record is equal to said predetermined number;

memory pointer means, responsive to advance signals applied thereto, for sequentially accessing the respective bytes in said memory, said memory pointer means accessing the header byte of the first record in sequence in response to said positioning indicia; means, responsive to accessed header bytes, for loading said time counter means with said accessed header time period indicia and said function counter means with said accessed header predetermined number indicia;

means, responsive to accessed function information bytes, for generating signals to said multiplexer to effect movement of the element identified in said accessed function byte to the identified desired position, and responsively generating said function executed signal to said function counter means; and means, responsive to said function executed indicia, said record completed indicia and said delay completed indicia, for selectively generating said advance signals to said memory pointer means to effect accessing of each function information bytes in a given record, time period, and thereafter effecting accessing of the header bytes of the next sequential record only after a delay period in accordance with said predetermined time period associated with said given record.

38. The system of claim 33 wherein each said section computer further includes:

stop means, responsive to a stop signal, for halting said cyclical operation of said elements; and machine cycle monitoring means, responsive to said machine cycle signals, for generating said stop signal if the machine cycle speed drops below a predetermined threshold.

39. A glass forming system, comprising at least one cyclically operable individual molding machine section including a plurality of separately operable elements;

feeder means for periodically applying molten glass to each said molding machine section; and a section computer means associated with each said molding machine section for generating signals to its respective molding machine section to effect cyclical operation of said elements in its respective molding machine section in synchronism with said feeder means to form rigid glassware from said applied molten glass;

each said section computer means comprising:

multiplexer means including a plurality of outputs, said multiplexer means including means responsive to address signals indicative of said outputs and data input signals applied thereto, for generating MUX output signals indicative of said data input signals, at the output indicated by said address signals;

a plurality of element driver means, at least one of said plurality of element driver means being associated with each of said plurality of elements in said respective molding machine section for generating signals to effect operation of said elements in accordance with driver data signals applied thereto;

means for coupling each of said plurality of element driver means to a multiplexer means output, said MUX output signals being applied thereto as said driver data signals;

a run table memory including a plurality of sequenced memory locations, at least one of said plurality of memory locations corresponding to each operation in said cyclical operation of said elements;

means for loading each of said run table memory locations with cycle point indicia of the relative point in said cyclical operation of said elements when the corresponding operation is to be effected, multiplexer output indicia of the multiplexer output corresponding to the element driver means associated with the element on which said corresponding operation is to be effected, and data signal indicia of the data signals for effecting said corresponding operation;

means connected to said multiplexer means for generating machine cycle signal indicative of increments of advancement of said mold machine section through said cyclical operation of said elements;

means, responsive to said machine cycle signal for generating a machine cycle count indicative of the instantaneous cyclical position of said mold machine section;

means, responsive to said machine cycle signal, and said machine cycle count, for selectively accessing said run table memory locations, and for comparing said cycle point indicia of said accessed run table locations to said machine cycle count;

means responsive to a favorable comparison for generating signals indicative of said multiplexer output indicia and said data signal indicia to said multiplexer means as said address input signal and data input signal, respectively; and wherein each said section computer means further comprises:

electronic components responsive to power signals of predetermined voltage from a primary power supply;

programmed stop means, responsive to a programmed stop signal, for stopping receipt of said molten glass and for effecting, a predetermined programmed stop sequence of element movements, whereby operation of the section is stopped only after all previously received molten glass has been cleared from the mold machine section;

an emergency stop means, responsive to an emergency stop signal, for effecting an immediate halt to element movement in the mold machine section and for placing said elements in a condition to facilitate clearing of said molten glass from said elements;

said system further provides an auxiliary power source for selectively providing said power signal when said primary power supply fails to provide said power signal; and means, cooperating with said auxiliary power source, for sensing provision of said power signal by said auxiliary power source and for generating a selected one of said programmed stop signal and emergency stop signal if said auxiliary power source provides said power signal for more than a predetermined time period.

40. The system of claim 39 wherein said programmed stop means includes:

means for detecting when all previously received molten glass has been cleared from said elements and, in response thereto, for generating a positioning signal; and means responsive to said positioning signal for effecting substantially concurrent movements of respective groups of non-conflicting ones of said elements to stop operation of the mold machine section with said respective elements in respective predetermined positions.

41. A glass forming system, comprising:

at least one cyclically operable individual molding machine section including a plurality of separately operable elements;

feeder means for periodically applying molten glass to each said molding machine section; and a section computer means associated with each said molding machine section for generating signals to its respective molding maching section to effect cyclical operation of said elements in its respective molding machine section in synchronism with said feeder means to form rigid glassware from said applied molten glass;

each said section computer means comprising:

multiplexer means, including a plurality of outputs, said multiplexer means including means responsive to address signals indicative of said outputs and data input signals applied thereto, for generating MUX output signals indicative of said data input signals, at the output indicated by said address signals;

a plurality of element driver means, at least one of said plurality of element driver means being associated with each of said plurality of elements in said respective molding machine section for generating signals to effect operation of said elements in accordance with driver data signals applied thereto;

means for coupling each of said plurality of element driver means to a multiplexer means output, said MUX output signals being applied thereto as said driver data signals;

a run table memory including a plurality of sequenced memory locations, at least one of said plurality of memory locations corresponding to each operation in said cyclical operation of said elements;

means for loading each of said run table memory locations with cycle point indicia of the relative point in said cyclical operation of said elements when the corresponding operation is to be effected, multiplexer output indicia of the multiplexer output corresponding to the element driver means associated with the element on which said corresponding operation is to be effected, and data signal indicia of the data signals for effecting said corresponding operation;

means connected to said multiplexer means for generating a machine cycle signal indicative of increments of advancement of said mold machine section through said cyclical operation of said elements;

means, responsive to said machine cycle signal for generating a machine cycle count indicative of the instantaneous cyclical position of said mold machine section;

means, responsive to said machine cycle signal, and said machine cycle count, for selectively accessing said run table memory locations, and for comparing said cycle point indicia of said accessed run table locations to said machine cycle count;

means responsive to a favorable comparison for generating signals indicative of said multiplexer output indicia and said data signal indicia to said multiplexer means as said address input signal and data input signal, respectively, and wherein each said section computer means comprises:

programmed stop means, responsive to a programmed stop signal, for stopping receipt of said molten glass and for stopping movement of said elements only after all previously received molten glass has been operated upon and cleared from the mold machine section; and emergency stop means, responsive to an emergency stop signal, for effecting an immediate halt to said timed sequence of element movement; and said system further comprises:

a primary power supply for generating power signals to said section computer means;

a battery;

means for selectively coupling said battery to provide said power signal to said section computer means in the event of an outage of said primary power supply;

means for generating first indicia of current drawn from said battery;

means for generating a second indicia of the voltage level of said battery;

means, responsive to said current indicia draw and said voltage level indicia, for detecting current drawn from said battery for a period of a duration longer than the first predetermined period, and, in response thereto, for generating to said section computer means one of said programmed stop and emergency stop signals in accordance with said voltage level indicia.

42. The system of claim 41 wherein said system further includes:
means for generating connection indicia of the state of electrical connection of said battery; and
means, responsive to said connection indicia for generating said emergency stop signal to said section computer means upon an indication of improper connection of said battery.

43. The system of claim 41 wherein said system further comprises
means for charging said battery.

44. The system of claim 41 wherein said system further includes:
charging means for charging said battery, and wherein said means for generating connection indicia comprises:
means for periodically disconnecting said charging means from said battery; and
means for generating a signal indicative of the voltage level of said battery with said charging means disconnected, whereby the connection of said battery into said system is monitored.

45. A glassware forming system comprising:
a glassware forming machine for forming glassware from molten glass;
a controller for controlling the operation of said glassware forming machine; and
means for coupling a primary power supply to said controller for powering said controller; wherein said controller includes:
a secondary power supply;
means for coupling said secondary power supply to said controller to power said controller in the event that said primary power supply fails to power said controller; and
means for monitoring the condition of said secondary power supply.

46. A system as recited in claim 45 wherein said monitoring means comprises means for monitoring the current being drawn from said secondary power supply.

47. A system as recited in claim 45 wherein said monitoring means comprises means for monitoring the voltage of said secondary power supply.

48. A system as recited in claim 45 wherein said monitoring means comprises means for monitoring the proper electrical coupling of said secondary power supply to said controller.

49. A system as recited in claim 45 wherein said controller further includes means for stopping said machine in the event said secondary power supply supplies power to said controller for more than a first predetermined period of time.

50. A system as recited in claim 49 wherein said machine includes a plurality of separately movable elements for forming said glassware from said molten glass, and wherein said stopping means comprises means for stopping said machine in accordance with a predetermined stop sequence for stopping said machine only after all previously applied molten glass is cleared from said elements.

51. A system as recited in claim 50 wherein said first predetermined period of time is from 1 to 5 seconds.

52. A system as recited in claim 49 wherein said stopping means further includes means for emergency stopping said system in the event said secondary power supply supplies power to said controller for more than a second predetermined period of time.

53. A system as recited in claim 52 wherein said second predetermined period of time comprises 30 minutes.

54. A system as recited in claim 45 wherein said secondary power supply comprises battery means.

55. The controller of claims 8 or 9 wherein said means responsive to a positioning signal comprises:
a memory including a plurality of sequenced bytes grouped in a plurality of sequenced records, each said record comprising
a header byte followed in sequence by a predetermined number of function information bytes, said header byte including indicia of said predetermined number of function information bytes in said record and indicia of a predetermined time period associated with said record;
each said function information byte including indicia of an element and indicia of a desired position for said element;
time counter means for selectively receiving header time period indicia and for generating a delay completed indicia at a time in accordance with said predetermined time period;
function counter means, selectively receptive of header predetermined number indicia and responsive to a function executed indicia for generating a record completed indicia when the number of functions executed in respect of a record is equal to said predetermined number;
memory pointer means, responsive to advance signals applied thereto, for sequentially accessing the respective bytes in said memory, said memory pointer means accessing the header byte of the first record in sequence in response to said positioning signal;
means, responsive to accessed header bytes, for loading said time counter means with said accessed header time period indicia and said function counter means with said accessed header predetermined number indicia;
means for responsive to accessed function information bytes, for generating an output signal to effect movement of the element identified in said accessed function information bytes to the identified desired position, and for responsively generating said function executed signal to said function counter means; and
means, responsive to said function executed indicia, said record completed indicia and said delay completed indicia, for selectively generating said advance signals to said memory pointer means to effect accessing of each function information byte in a given record time period, and thereafter effecting accessing of the header bytes of the next sequential record only after a delay period in accordance with said predetermined time period associated with said given record.

* * * * *